United States Patent Office
3,283,004
Patented Nov. 1, 1966

3,283,004
2-[p-(HALOGENATED-BICYCLO-[2.2.1]-HEPT-5-EN-2-YL)BENZYL] - 2 - THIOPSEUDOUREA COMPOUNDS
Carleton W. Roberts, Midland, and Daniel H. Haigh, Beaverton, Mich., assignors to The Dow Chemical Company, Midland, Mich., a corporation of Delaware
No Drawing. Filed Nov. 6, 1963, Ser. No. 321,680
3 Claims. (Cl. 260—564)

This application is a continuation-in-part of application Serial No. 240,138, filed November 26, 1962, and now abandoned.

This invention relates to organic chemistry, and more particularly to compounds of formula:

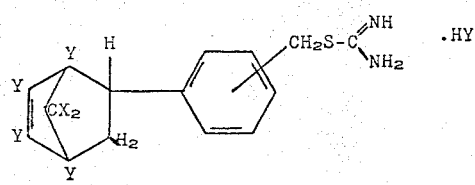

wherein X represents hydrogen or halogen of atomic weight less than 50, and Y represents halogen of atomic weight of 25 to 100. The compounds are crystalline solids and they are useful to kill internal parasites of warm-blooded animals without harm to the animals; as insecticides, to control both bacteria and fungi harmful to plants. They cause little or no harm to living plants. Also, they are useful as soil-conditioning agents.

These new compounds may be prepared by the Diels-Alder diene synthesis. The reaction may be simply carried out by causing a reaction of a cyclopentadiene compound of the formula

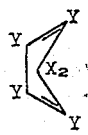

wherein X and Y have the values hereinbefore indicated, as the diene with, as dienophile, an ar-vinylbenzyl compound of the formula

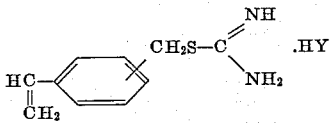

to obtain the product. The reactants are consumed in equimolecular amounts and may thus be supplied to the reaction. It is advantageous but not necessary to use an inert liquid reaction medium, such as xylene, hexane, heptane, octane, nonane, petroleum ether, benzene, toluene, cumene, ethylbenzene, diethylbenzene, ethyltoluene, chlorobenzene, orthodichlorobenzene, chlorotoluene, chloroethylbenzene, chloroxylene, and the like, of which the boiling serves to control the reaction temperature. The reaction goes forward at temperatures over a wide range, such as 10° C. to 300° C., and may be carried out at any temperature from about 60° C. to about 200° C., but is preferably carried out at about 100° C. to 160° C.

A reaction mixture of the reactants and reaction medium, if any, may be brought together in a reaction vessel at room temperature whereupon the desired reaction takes place at once to some extent. When more rapid rate of reaction is desired, the reactants may be caused to react at a higher rate by heating the reaction mixture. The reaction usually goes to completion in from about one hour to about 60 hours, with formation of desired product and minor amounts of other substances. The product can be used in a completely crude form for many of its advantageous uses.

When it is desired to recover the desired compound essentially pure, the product of reaction can be recrystallized from a solvent or mixture of solvents, and product crystals washed with a non-solvent or poor solvent for product in which one or more suspected impurities is soluble.

Suitable diene starting materials in the present synthesis include hexachlorocyclopentadiene, 1,2,3,4-tetrachlorocyclopentadiene, 1,2,3,4-tetrabromo-5,5-difluorocyclopentadiene, and the like.

The following examples without more will enable those skilled in the art to practice the present invention.

Example I.—Preparation of 2-[p(1,4,5,6,7,7-hexachlorobicyclo - [2.2.1] - hept - 5 - en - 2 - yl) - benzyl] - 2 - thiopseudourea hydrochloride A mixture of 78 grams (0.185 mole) of 2-(ar-chloromethylphenyl) 1,4,5,6,7,7-hexachlorobicyclo-[2.2.1]-heptene-5, 21.1 grams (0.28 mole) thiourea and 500 milliliters isopropanol were placed in a one liter, round-bottomed flask over a steam bath and equipped with a reflux condenser, and heated to reflux temperature, about 85° C. The resulting mixture was heated under reflux for 16 hours to prepare the present product which precipitated as a solid in the mixture. The reaction mixture was cooled and filtered to obtain a crude product as residue. The residue solid was recrystallized from a mixture of 3 parts methanol and 1 part chloroform to obtain, in good yield, a while crystalline solid 2-[p-(1,4,5,6,7,7-hexachlorobicyclo-[2.2.1]hept-5-en-2-yl)benzyl] - 2 - thiopseudourea hydrochloride product melting with at least incipient decomposition at 285–286° C. Infrared spectrum analysis confirmed the assigned structure.

The starting 2-(ar-chloromethylphenyl)-1,2,4,5,6,7,7-hexachlorobicyclo-[2.2.1]heptene-5 starting material is readily prepared as a Diels-Alder adduct of ar-vinylbenzyl chloride and hexachlorocyclopentadiene. The use of adducts with, for example, 1,2,3,4-tetrabromo-5,5-difluorocyclopentadiene-1 obtains the correspondingly halogenated chloromethylphenyl adduct and, therefrom, a correspondingly halogenated product of the present invention.

Example II.—Preparation of 2-[p-(1,4,5,6-tetrachlorobicyclo-[2.2.1]-hept-5-en-2-yl)benzyl]-2-thiopseudourea hydrobromide A mixture of 231.2 grams (1.0 mole) of p-vinylbenzyl thiopseudourea hydrobromide and 500 milliliters toluene is placed in a one liter, round-bottomed flask equipped with heating mantle, dropping funnel and reflux condenser, and heated to reflux temperature, about 110–120° C. Thereto during 45 minutes is added, dropwise, 201 grams (1 mole) 1,2,3,5-tetrachlorocyclopentadiene. The resulting mixture is heated under reflux for 30 hours to prepare the present product. The reaction mixture is cooled and filtered to obtain a crude product as residue. The residue solid is recrystallized from a mixture of 3 parts methanol and 1 part chloroform, to obtain, in good yield, a white solid 2-[p-(1,4,5,6-tetrachlorobicyclo-[2.2.1]-hept-5-en-2-yl)benzyl] - 2 - thiopseudourea hydrobromide product melting with decomposition at a temperature above 250° C. and useful as an insecticide. Infrared spectrum analysis confirms the assigned structure.

In similar procedures the other products of the present invention are readily prepared.

A compound of the present invention is dispersed in a highly volatile compressed halocarbon solvent-propellant such as a chlorodifluoromethane, and, from a valve-equipped pressure vessel the resulting mixture is discharged as an aerosol over a body of water containing live larvae of mosquitoes of various species. A relatively uniform dispersion of the compound over the water surface is effected, at the rate of several milligrams per square decimeter, the exact amount of deposit not determined. No other influence adverse to the growth of mosquito larvae affects the said water. Twenty-four hours after application the water is examined for mosquito larvae: numerous dead larvae are found, and no live ones. In a nearby check area, most of the larvae are alive, the dead representing only natural mortality.

Also any of the present compounds applied to young tomato plants protects the plants from subsequent inoculation with spores of tomato early blight (*Alternaria solani*) or late blight (*Phytophthora infestans*). It also prevents infestation of some fruits by fire blight.

When applied to a soil surface in good tilth, the compounds, or any of them, prevent crust formation and maintain good soil condition.

We claim:
1. Compound of the formula

$$\text{[structure with Y, H, CX}_2\text{, H}_2\text{, benzene ring, CH}_2\text{S-C(=NH)(NH}_2\text{)} \cdot \text{HY]}$$

wherein X represents a member of the group consisting of hydrogen and halogen of atomic weight less than 50, and Y represents halogen of atomic weight of 25 to 100.

2. 2-[p-(1,4,5,6,7,7-hexachlorobicyclo-[2.2.1] - hept-5-en-2-yl)-benzyl]-2-thiopseudourea hydrochloride.

3. 2-[p-(1,4,5,6-tetrachlorobicycle-[2.2.1]-hept - 5 - en-2-yl)benzyl]-2-thiopseudourea hydrobromide.

No references cited.

CHARLES B. PARKER, *Primary Examiner.*